(12) United States Patent
Bhakta

(10) Patent No.: US 10,473,284 B2
(45) Date of Patent: Nov. 12, 2019

(54) APPARATUS FOR SPATIALLY AND SPECTRALLY ADAPTABLE DICHROMATIC WHITE LIGHT SOURCE USING SPATIAL LIGHT MODULATOR

(71) Applicant: TEXAS INSTRUMENTS INCORPORATED, Dallas, TX (US)

(72) Inventor: Vikrant R. Bhakta, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/154,417

(22) Filed: Oct. 8, 2018

(65) Prior Publication Data

US 2019/0041018 A1  Feb. 7, 2019

Related U.S. Application Data

(62) Division of application No. 15/163,357, filed on May 24, 2016, now Pat. No. 10,094,530.

(Continued)

(51) Int. Cl.
*G02F 1/01* (2006.01)
*G03H 1/08* (2006.01)
(Continued)

(52) U.S. Cl.
CPC ............. *F21S 41/14* (2018.01); *F21S 41/675* (2018.01); *F21V 9/30* (2018.02); *F21V 14/04* (2013.01);
(Continued)

(58) Field of Classification Search
CPC .... F21S 48/1757; F21S 48/125; F21S 48/328; F21S 48/1145; F21S 48/1131;
(Continued)

(56) References Cited

U.S. PATENT DOCUMENTS 5,592,327 A  1/1997  Gabl et al.
6,193,393 B1  2/2001  Dove et al.
(Continued)

FOREIGN PATENT DOCUMENTS

CN  101180778 A  5/2008
CN  101213481 A  7/2008
(Continued)

OTHER PUBLICATIONS

Supplementary European Search Report for Patent Application No. EP 14868935 dated Jul. 18, 2017; 3 pages.

(Continued)

*Primary Examiner* — Tracie Y Green
(74) *Attorney, Agent, or Firm* — Michael A. Davis, Jr.; Charles A. Brill; Frank D. Cimino

(57) ABSTRACT

In described examples of an automotive headlamp, a first illumination source outputs a first color light, and a second illumination source outputs a second color light different from the first color light. A digital micromirror device receives the first color light and the second color light and reflects the first color light and the second color light. A projection optics receives reflected light from the digital micromirror device and outputs a beam from the automotive headlamp having a color that is a combination of the first and second colors. A controller controls intensity and duration of the first illumination source and the second illumination source, controls a pattern on the digital micromirror device, and spectrally tunes the color of the output beam.

15 Claims, 10 Drawing Sheets

Related U.S. Application Data

(60) Provisional application No. 62/184,485, filed on Jun. 25, 2015.

(51) Int. Cl.
| | | |
|---|---|---|
| *F21S 41/14* | (2018.01) | |
| *F21V 29/77* | (2015.01) | |
| *F21V 23/00* | (2015.01) | |
| *G02B 26/08* | (2006.01) | |
| *F21V 14/04* | (2006.01) | |
| *F21S 41/675* | (2018.01) | |
| *F21V 9/30* | (2018.01) | |
| *F21Y 101/00* | (2016.01) | |
| *F21S 41/141* | (2018.01) | |
| *F21S 45/47* | (2018.01) | |

(52) U.S. Cl.
CPC ............ *F21V 23/003* (2013.01); *F21V 29/77* (2015.01); *G02B 26/0833* (2013.01); *F21S 41/141* (2018.01); *F21S 45/47* (2018.01); *F21Y 2101/00* (2013.01)

(58) Field of Classification Search
CPC ........ F21S 48/1317; F21V 9/16; F21V 14/04; F21V 23/003; F21V 29/77; G02B 26/0833; F21Y 2101/00
See application file for complete search history.

(56) References Cited

U.S. PATENT DOCUMENTS

| | | |
|---|---|---|
| 7,357,513 B2 | 4/2008 | Watson et al. |
| 8,455,890 B2 | 6/2013 | Kwon et al. |
| 8,937,759 B2 | 1/2015 | Holmes |
| 2002/0196636 A1 | 12/2002 | Dassanayake et al. |
| 2004/0188594 A1 | 9/2004 | Brown et al. |
| 2006/0082861 A1 | 4/2006 | Heureux |
| 2013/0284943 A1 | 10/2013 | Brukilacchio et al. |
| 2014/0002801 A1 | 1/2014 | Miura |
| 2015/0252974 A1 | 9/2015 | Hu |
| 2015/0377430 A1 | 12/2015 | Bhakta |
| 2016/0347237 A1 | 12/2016 | Bhakta et al. |

FOREIGN PATENT DOCUMENTS

| | | |
|---|---|---|
| DE | 102006045692 A1 | 4/2008 |
| EP | 1489854 A2 | 12/2004 |
| EP | 2980470 A1 | 2/2016 |
| JP | 2008134324 A | 6/2008 |
| WO | 2006105249 A2 | 10/2006 |
| WO | 2006130640 A1 | 12/2006 |
| WO | 2015033764 A1 | 3/2015 |

OTHER PUBLICATIONS

Chinese Office Action for 201610464219.6 dated Jan. 4, 2018; 5 pages.

APPARATUS FOR SPATIALLY AND SPECTRALLY ADAPTABLE DICHROMATIC WHITE LIGHT SOURCE USING SPATIAL LIGHT MODULATOR

CROSS REFERENCE TO RELATED APPLICATIONS

This application is a divisional of U.S. patent application Ser. No. 15/163,357 filed May 24, 2016, which claims the benefit of priority to U.S. Provisional Patent Application Ser. No. 62/184,485 filed Jun. 25, 2015, both of which are incorporated herein by reference.

TECHNICAL FIELD

This relates generally to spectrum adjustable lighting sources, and more particularly to patterned, spectrally adjustable light sources utilizing a spatial light modulator.

BACKGROUND

White light is important in many lighting applications such as automotive headlamps, general lighting, photography, and microscope illumination. Inconsistency of the observed white color can result in undesirable shifts in appearance. Not all "white" light bulbs give out the same color white light. Labeling on currently available white bulbs may indicate "warm" white or "cool" white. The labeling is based on a correlated color temperature (CCT) rating. CCT indicates the expected color appearance, and it is a simplified representation of the spectral power distribution (SPD) for a given light source. By industry convention, a light source with a CCT in the 2700K to 3000K range provides a "warm" white light, while a light source with a CCT in the 4000K to 6500K range provides a "cool" white. After the desired white light color has been identified, bulbs that are currently available also have issues of color consistency between different bulbs having the same CCT ratings. Also, shifts in the observed color can occur during the lifetime of the light source as components age.

U.S. Patent Publication No. 2015/0252974 to Darwin Hu ("Hu") discloses creating white light using two color sources. Hu describes green laser beams applied to excite a magenta phosphor substrate to create white light. However, the white color will still change as the phosphor ages, and as the color output of the blue LEDs changes with age.

SUMMARY

In described examples of an automotive headlamp, a first illumination source outputs a first color light, and a second illumination source outputs a second color light different from the first color light. A digital micromirror device receives the first color light and the second color light and reflects the first color light and the second color light. A projection optics receives reflected light from the digital micromirror device and outputs a beam from the automotive headlamp having a color that is a combination of the first and second colors. A controller controls intensity and duration of the first illumination source and the second illumination source, controls a pattern on the digital micromirror device, and spectrally tunes the color of the output beam.

DETAILED DESCRIPTION OF EXAMPLE EMBODIMENTS

Corresponding numerals and symbols in the different figures generally refer to corresponding parts unless otherwise indicated. The figures are not necessarily drawn to scale.

The term "coupled" may also include connections made with intervening elements, and additional elements and various connections may exist between any elements that are "coupled."

An illumination source may be referred to herein as a light source or a lamp. For example, a blue illumination source (referred to as a blue lamp or a blue light source) can include one or more blue LEDs, or one or more blue laser diodes, or a blue incandescent bulb.

Example embodiments provide spatially adaptable and spectrally tunable light sources using dichromatic illumination. In an example, at least two illumination sources of differing color illuminate a spatial light modulator that reflects light, and the reflected light is projected from a lens to form an output beam, such as a white output beam. A controller modulates the intensity and duration of the illumination sources to spectrally tune the output beam. In additional alternative arrangements, image data can be applied to the spatial light modulator to adapt the output beam in shape or in content. While certain examples discussed herein are presented in the context of a headlamp, such as an automotive headlamp, the embodiments are not so limited. Example embodiments can be utilized in illumination systems that output light generally. Example applications include: flashlights, spotlights, marine, aviation and vehicle headlamps, industrial lighting, outdoor illumination such as street lights, path lights, safety and security lighting, and general lighting fixtures. While white output light is described in certain examples presented herein, other colors can be output by the embodiments.

Figure 1:
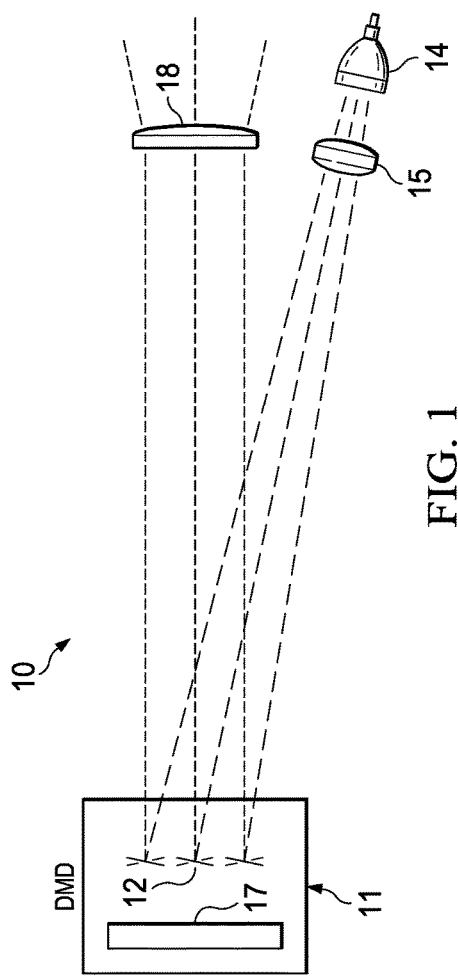
FIG. 1 illustrates a digital micromirror (DMD) device in a conventional projection system.

FIG. 1 illustrates a conventional arrangement using a digital micromirror device (DMD) as a spatial light modulator device to project light for illumination. DMDs are available from Texas Instruments Incorporated in various form factors. In system 10, a single light source 14 and illumination optics 15 direct light from the light source 14 onto the face of a DMD device 11. The DMD device 11 is formed by micro-electromechanical system (MEMS) technology that is based in part on semiconductor device processing. An array of micromirrors 12 is formed over a semiconductor substrate 17. In an example process, the micromirrors are formed of aluminum and are each mounted on a hinged mechanism. The micromirrors are attached on a hinge and can be tilted using electronic signals applied to electrodes that control a tilt by pivoting the micromirrors about an axis. In an example DMD device, thousands or perhaps millions of the micromirrors are formed in an array that forms a VGA, 720p or 1080p resolution imaging device. Individual micromirrors 12 are positioned to reflect the light from the illumination optics 15 to a projection lens 18. A beam of light is projected out of the system 10. The micromirrors 12 are individually addressable, and each has an associated memory cell that determines the state of the micromirror during an active illumination period.

The micromirrors 12 each have three individual states, which are: a first "ON" state; a second "OFF" state; and a third "FLAT" state. In the ON state, the micromirrors 12 in FIG. 1 tilt in a first position away from the FLAT position, due to signals on an electrode that cause the hinges to flex. In system 10, the micromirrors 12 are positioned to reflect incoming light from illumination optics 15 outwards to the projection lens 18 in the ON state. In the OFF state, the micromirrors 12 tilt in a different position and reflect the light away from the projection lens 18. In some arrangements, the light is directed to a "light dump" (not shown) or thermal energy collector. By varying the tilt positions using electrical control signals, each of the micromirrors 12 can direct reflected light to the projection lens 18. The mirrors can also reflect the light away from the projection lens 18. The FLAT state is the position the micromirrors take when no power is applied to the DMD device. In at least one example, the FLAT position is 0 degrees, and a very small pixel (VSP) DMD from Texas Instruments Incorporated has an ON state tilt of about +12 degrees and an OFF state tilt of about −12 degrees. Other DMD devices provide different tilt angles, such as +/−10 degrees, or +/−17 degrees.

Figure 2B:
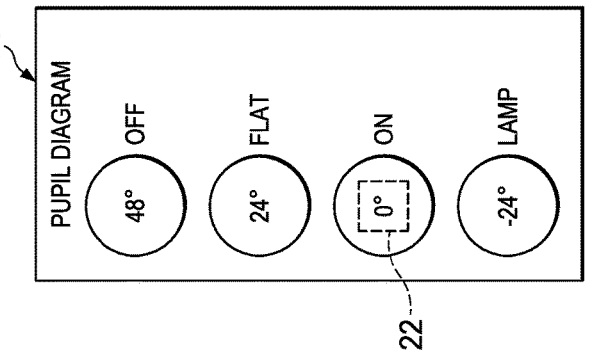
FIGS. 2A and 2B illustrate operations of a conventional DMD projection system.
Figure 2A:
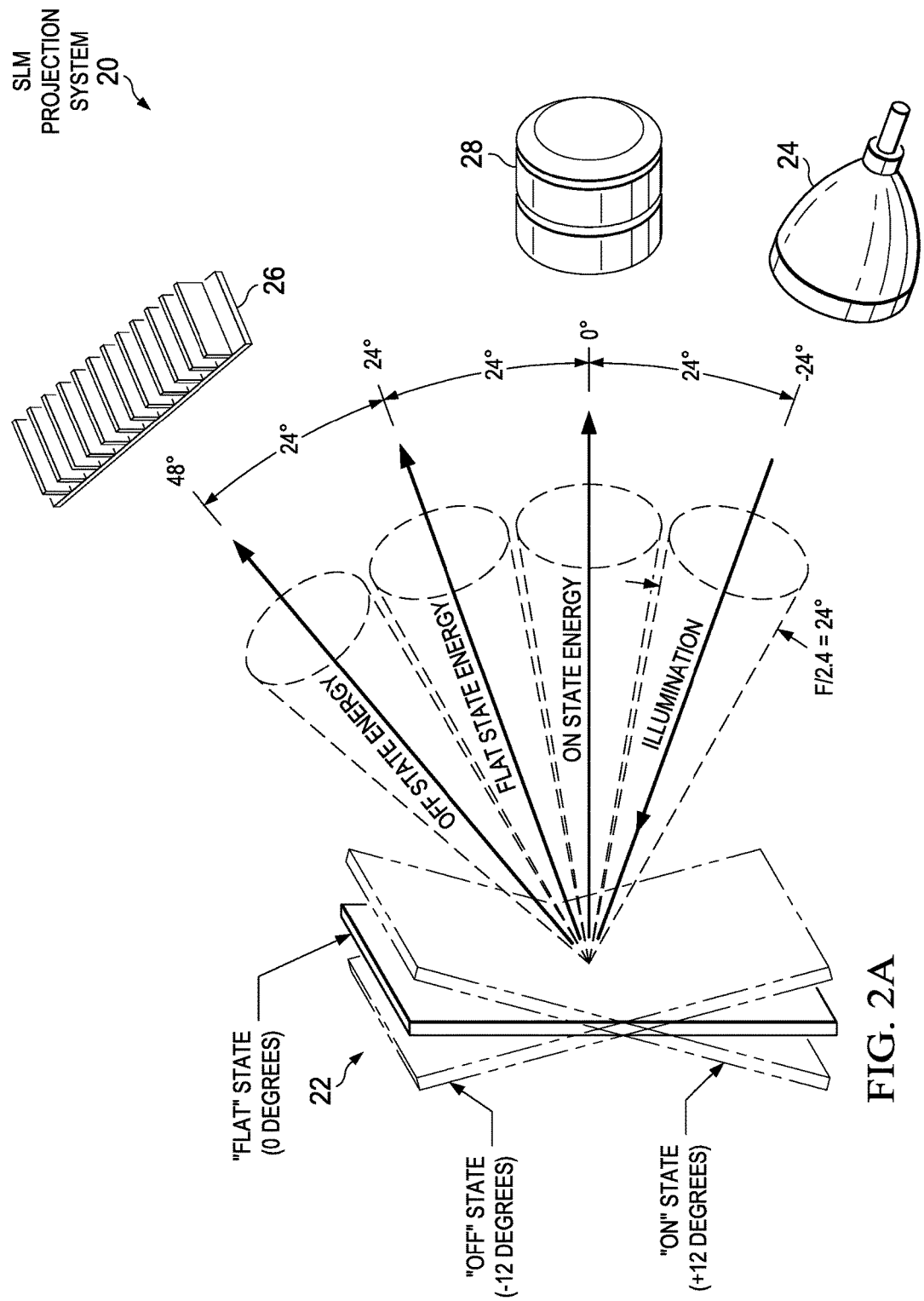

FIGS. 2A and 2B further illustrate the operation of the micromirrors in a conventional projector incorporating a DMD as a spatial light modulator. In FIG. 2A, projection system 20 incorporates a single illustrative micromirror 22. In the actual device, the DMD will have thousands or millions of these mirrors 22 arranged in a two dimensional array. FIG. 2A illustrates the various positions of the micromirrors. In the ON state, the micromirror 22 is at a first tilted position ON, such as +12 degrees from the vertical or FLAT position. The illumination source 24 is angled at −24 degrees from the zero degree position, which is aligned with the projection lens 28. When reflecting from the surface of a mirror, the angle of incidence (AOI) of the incoming light is equal to the angle of reflection (AOR) of the reflected light; therefore, for a +12 degree tilt, the −24 degree angle for the illumination source results in reflected light at the zero degree position, as shown in FIG. 2A. The cone of reflected light labeled ON STATE ENERGY shows the reflected light directed outwards from the VSP micromirror 22 at the zero degree position. When the VSP micromirror 22 is in the ON state, the light from the illumination source 24 is reflected as the cone of light labeled ON STATE ENERGY at zero degrees into the projection lens 28. The projected light is then output from the system 20. The VSP micromirrors can also be found in a FLAT state position when the DMD is not powered. When the VSP micromirrors are in the FLAT state, the illumination source is usually not powered in a video projection system. The micromirrors in the DMD 22 can also be driven to an OFF state. In the OFF state position, the VSP micromirror 22 is at a second tilted position at an angle of −12 degrees from the FLAT position, and (in the OFF state) the light that strikes the VSP micromirror is reflected away from the projection lens 28 and is not output from the system 20, but instead is output into a light dump 26. Light dump 26 can be a heat sink that dissipates heat from the light. When the mirror 22 is in the OFF state, the reflected light is prevented from exiting the system.

In conventional projection systems, the FLAT position of the VSP micromirror 22 is usually not operated when light is output from the system. All of the DMD micromirrors move to the FLAT position when power to the DMD device is turned off. The FLAT position is sometimes referred to as a "parked" or "safe" position for the VSP micromirror 22.

FIG. 2B illustrates a pupil diagram 29 for the conventional projector, including the pupil positions for the three mirror states (OFF, FLAT, ON) and the pupil position of the light source (LAMP). Also, the pupil diagram 29 shows the approximate position of micromirror 22 (FIG. 2A) centered in the ON state pupil. In pupil diagram 29, the illumination source for a conventional projector is positioned at pupil position LAMP. The ON pupil position is adjacent and above the LAMP pupil position. The FLAT pupil position is adjacent and above the LAMP pupil position, and the OFF pupil position is adjacent and above the FLAT pupil position. As illustrated in the pupil diagram, the positions of the pupils are centered on a vertical line due to the VSP micromirror having a single acting hinge. This type of VSP DMD is commercially available and sold by Texas Instruments Incorporated. For example, the Texas Instruments Incorporated device DLP3000 has an array of 608×684 micrometer sized mirrors, equating to more than 400,000 micromirrors.

Figure 3B:
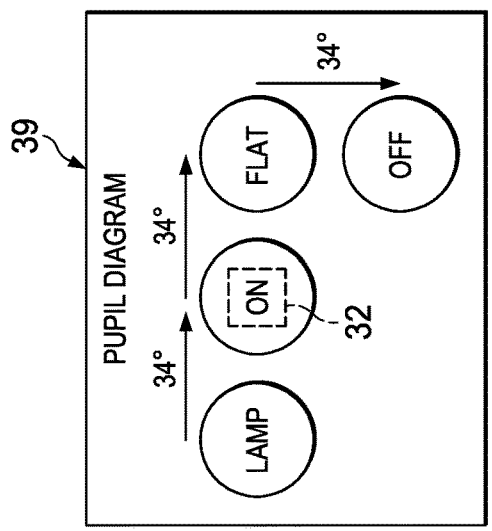
FIGS. 3A and 3B illustrate operations of an alternative conventional DMD projection system.
Figure 3A:
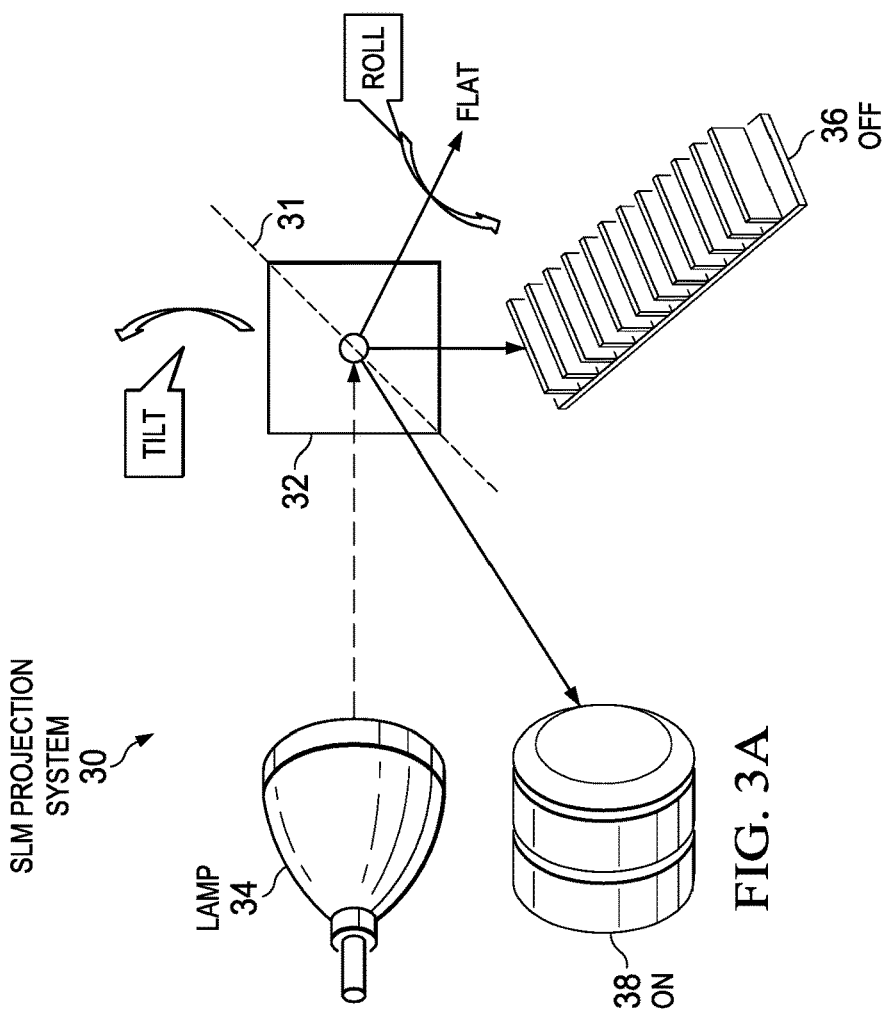

FIGS. 3A and 3B illustrate another DMD technology for projection systems that can be included in the embodiments. FIG. 3A shows a "tilt and roll pixel" (TRP) micromirror 32 currently available from Texas Instruments Incorporated. In TRP technology, the micromirrors are formed on a compound hinge (along an axis shown as a dashed line labelled 31) resulting in the micromirrors tilting left horizontally from the FLAT position in a first tilt position (which is the ON position) and tilting downwards from the FLAT position in a second tilt position (which is the OFF position).

In FIG. 3A light from an illumination source (LAMP 34) is focused on the TRP micromirror 32 through a focusing lens set (not shown). When the TRP mirror 32 is in the ON position (ON state), the light beam is reflected from the TRP micromirror 32 to the projection lens set 38. When the TRP mirror is in the OFF position (OFF state), the light reflects from the TRP micromirror 32 to a light dump 36. The FLAT state is not normally utilized for projecting light in a conventional projection system; however, if lamp 36 is on while the mirrors are in the FLAT state, the light reflects from TRP micromirror 32 along the axis labeled FLAT.

FIG. 3B illustrates the pupil diagram 39 for the TRP micromirror 32 of FIG. 3A. The pupil diagram 39 for the TRP DMD is different than the pupil diagram 29 described hereinabove for the VSP DMD 22 shown in FIG. 2B. In the TRP pupil diagram 39 of FIG. 3B, the three pupil positions (ON, FLAT, OFF) and the position of the illumination source LAMP are indicated and correspond to the axis positions of the same named items in FIG. 3A. Also, the pupil diagram 39 shows the approximate position of the TRP micromirror 32 centered behind the ON pupil position. As illustrated, the pupil positions form a right angle due to the compound hinge of the TRP micromirror technology. A commercially available part DLP3114 manufactured by Texas Instruments Incorporated is an example of a TRP DMD device and has a tilt of +/−17 degrees. As illustrated in the TRP pupil diagram of FIG. 3B, when utilized in a conventional projector system, the TRP DMD is illuminated from the LAMP pupil position. The ON pupil position is adjacent and right of the "lamp" pupil position along a 34 degree axis. The FLAT pupil position is adjacent and right of the ON pupil position along a 34 degree axis, and the OFF pupil position is adjacent and below to the FLAT pupil position along a 34 degree axis. Although the TRP pupil diagram 39 in FIG. 3B is different compared to the VSP pupil diagram 29 of FIG. 2B, a TRP DMD will enable an aspect of example embodiments to function well.

Figures 4A, 4B:
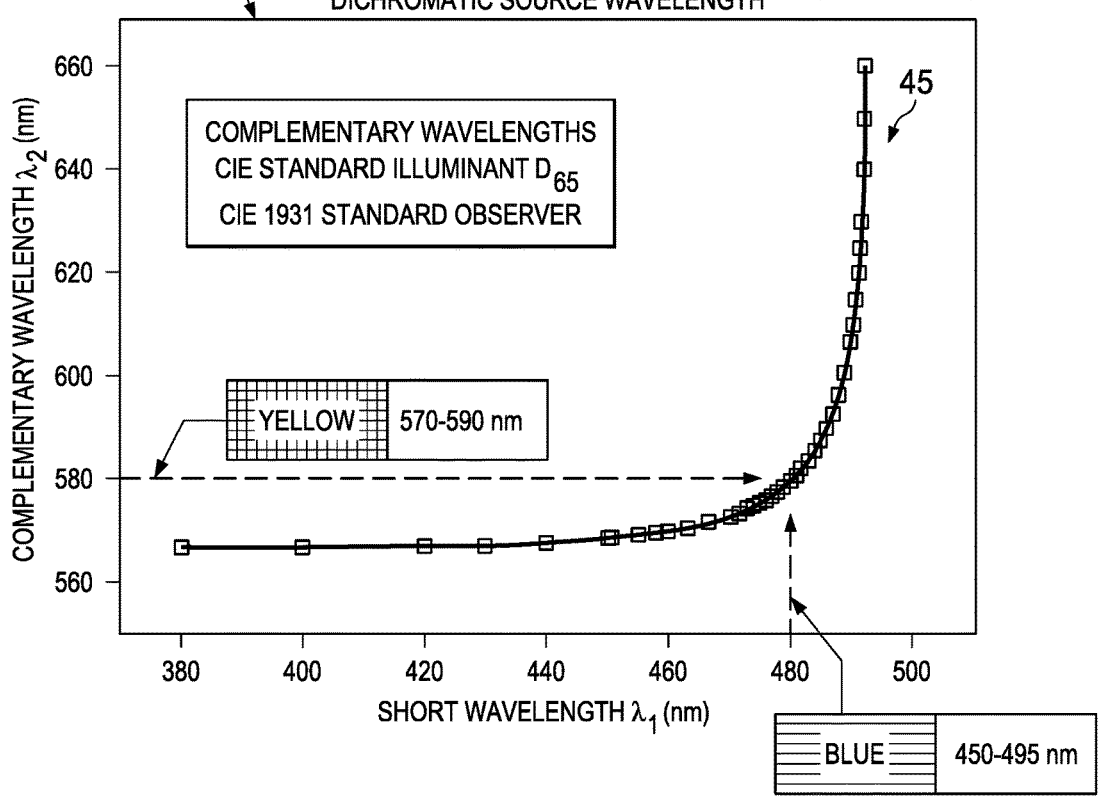
FIGS. 4A and 4B are a chart and a graph illustrating the relationship of dichromatic light sources.

FIGS. 4A and 4B depict charts that illustrate combinations of dichromatic light to form white light. Table 41 in FIG. 4A correlates visible light colors to ranges of wavelengths shown in nanometers. Although colors are continuous throughout the spectrum of visible light, the generally accepted color ranges are indicated in the table of FIG. 4A as noted on Wikipedia.org at the uniform resource locator (URL): https://en.wikipedia.org/wiki/Visible_spectrum.

FIG. 4B depicts a graph 43 that indicates complimentary light wavelengths that are perceived as white light by the human eye when the colors are combined in the proper proportion. The graph 43 of FIG. 4B is found in Chapter 20, FIG. 20.2 of the light emitting diode website located at the uniform resource locator (URL): https://www.ecse.rpi.edu/~schubert/Light-Emitting-Diodes-dot-org. Graph 43 of FIG. 4B has light wavelength shown on the Y axis with increasing value moving up, and the X axis shows wavelength with increasing value moving to the right. The data line labelled 45 indicates the complementary wavelengths resulting in the perception of white light as perceived by the human eye. The Y axis begins near the green color range at the bottom and moves up to red color at 660 nm. The X axis begins in the violet color range at 380 nm and extends up to approximately 495 nm (extending through the blue color range). As the data line 45 indicates, numerous colors could be combined to create light that appears white to a human observer. Of special interest in FIG. 4B is the combination of blue light near 480 nm on the X axis and yellow light near 580 nm on the Y axis. A combination of the blue and yellow in the proper proportion will create a white light as perceived by the human eye.

U.S. Patent Publication No. 2015/0377430, entitled "Hybrid Illumination for Headlamp" naming this application's inventor, Vikrant R. Bhakta, ("Bhakta") as inventor, published Dec. 31, 2015, is co-owned with this application and is hereby incorporated by reference in its entirety herein. Bhakta describes creating dichromatic white light by combining yellow and blue light sources. Bhakta discloses a blue laser directed to illuminate a yellow phosphor element, causing it to phosphoresce and emit yellow light; the emitted yellow light is then combined with the dispersed blue laser light beam to create a white light source. Bhakta also discloses a dichroic mirror mixing yellow light emitted from the phosphor with additional blue light sourced from a blue LED. The mixed light creates a "static" white color.

Figure 5A:
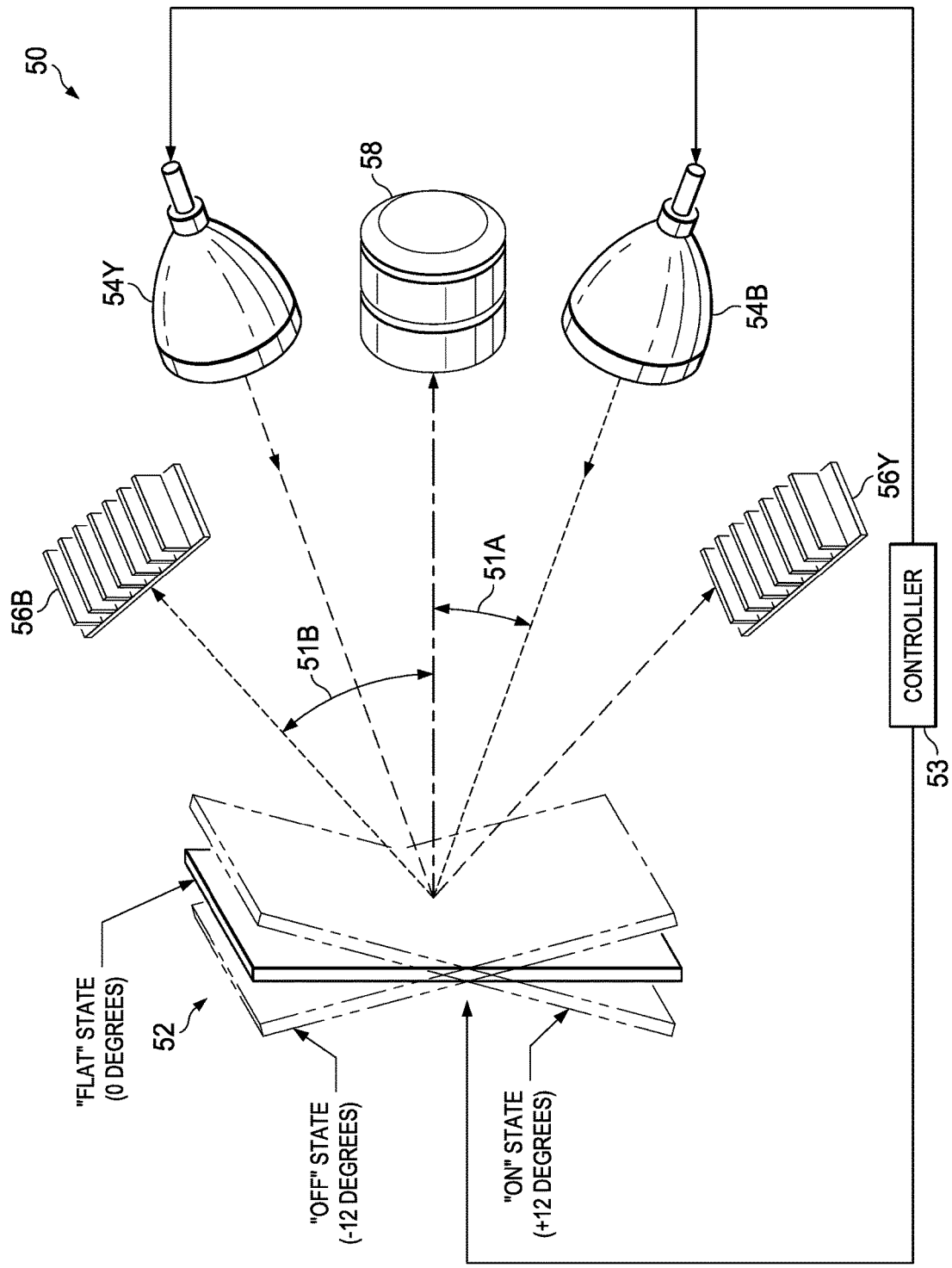
FIGS. 5A and 5B depict an example arrangement including a VSP DMD, and a corresponding pupil diagram.
Figure 5B:
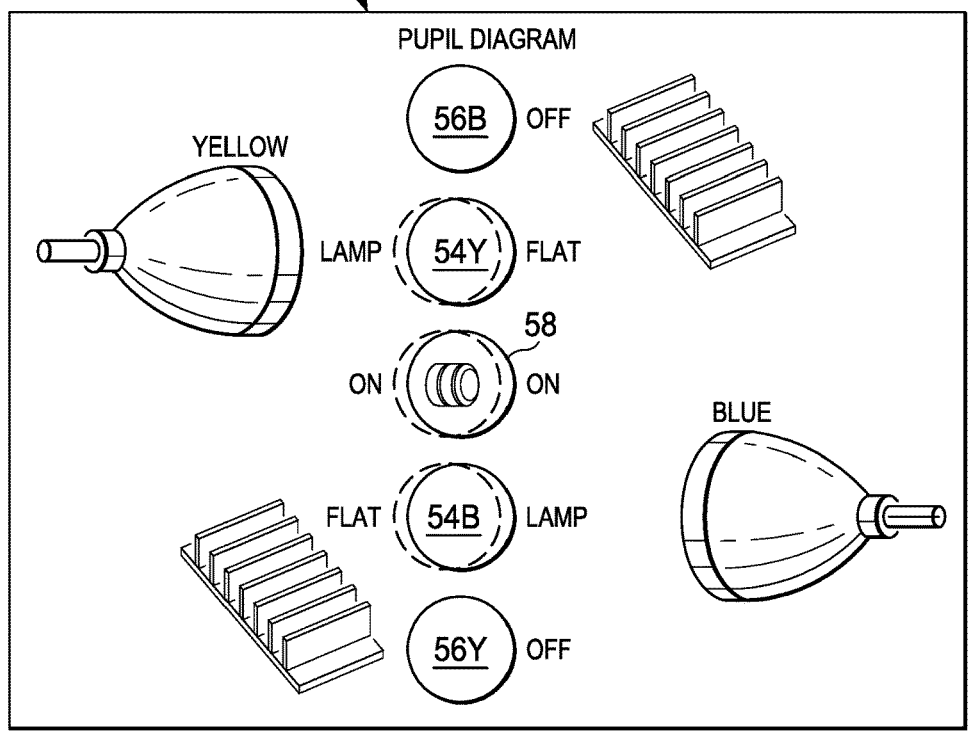

FIGS. 5A and 5B depict an example embodiment utilizing a VSP DMD and a corresponding pupil diagram. In projection system 50, a single illustrative VSP micromirror 52 illustrates the three positions of a VSP micromirror in a dichromatic system. The FLAT position occurs when the device is unpowered and will be the reference position of 0 degrees. The ON position occurs when the mirror is selected and it tilts to a first tilted position, such as +12 degrees from the FLAT state. The OFF position occurs when the mirror is deselected and it tilts to a second tilted position, such as −12 degrees from the FLAT state. A lens set 58 is located on the FLAT state axis of 0 degrees, and this is the exit axis for white light from the white light system 50. A yellow illumination source 54Y and a blue illumination source 54B are located on an axis +/−24 degrees 51*a* from the FLAT state position of 0 degrees. Light dumps 56B and 56Y are located on an axis of +/−48 degrees 51*b* from the FLAT state position of 0 degrees and are essentially heat sinks that dissipate heat from the light and block light from exiting the system. Controller 53 synchronizes the movement of the VSP micromirrors 52 based on image data supplied electronically by conventional methods and modulates the illumination sources 54Y, 54B to perform spectral tuning of the white light output.

By outputting yellow and blue light through the system in rapid sequences, and by controlling the time duration for display of the yellow and blue light, the white light at the output can be spectrally tuned by the controller 53. By controlling the respective duty cycles of the yellow and blue light, a desired white spectrum light is produced. As the lighting sources age and the respective colors change, the white output color can be dynamically tuned to return the white spectrum light to the desired color. Tuning can be achieved by suitable programming of controller 53, so no invasive repair of the system is needed. The various embodiments allow the white output of a system, such as an automotive headlamp, to be spectrally tuned after manufacture and throughout the life of the system, without needing to open the system. This can be done simply by programming the controller 53. Dynamic spectral tuning is important, especially when manufacturing headlamp systems for different automotive models, or when shipping headlamp systems to different countries that may impose different standards on the white color required for vehicle headlamps. Also, easy compensation is achieved for the normal changes in white color that may result as the system ages. In applications where a sensor such as a forward looking camera or other light sensors are available, the controller 53 can sense changes in the spectrum of white color that is being output and automatically compensate the color by spectral tuning of the yellow and blue light sources. Alternatively, the system can be calibrated or recalibrated on an occasional basis. Also, the addressable pixels in the DMD arrays allow both spatial and spectral tuning, so local portions of the output beam can be spectrally tuned using the individual DMD pixels and controller 53.

In FIG. 5A, yellow light from the yellow lamp 54Y passes through a focusing lens set (not shown) that focuses the yellow light on the VSP micromirrors 52. The VSP micromirrors are electrically selected or deselected individually, based on image data presented electronically to the DMD by the controller or by another image processing device (not shown). For the electrically deselected mirrors, which tilt to the −12 degree or OFF state, the yellow light is reflected from the DMD mirrors to the lens set 58 to exit the white light system. Electrically selected mirrors tilt to the +12 degree or ON position, and the yellow light reflects from the selected DMD mirrors to the yellow light dump 56Y.

For the blue light path in FIG. 5A, blue light from the blue lamp 54B passes through a focusing lens set (not shown) that focuses the blue light on the VSP micromirrors 52. In operation, the VSP micromirrors 52 are electrically selected or deselected based on image data presented electronically to the DMD. For the electrically selected mirrors, which tilt to the +12 degree or ON state, the blue light is reflected from the DMD mirrors to the lens set 58 to exit the white light system. Electrically deselected mirrors tilt to the −12 degree or OFF position, so the blue light is reflected from the DMD mirrors to the blue light dump 56B. Although the light sources are symmetrically located on opposite sides of the light output axis of 0 degrees as shown in FIG. 5A, the blue light is reflected to the output axis when a mirror is selected or in the ON position, while the yellow light is reflected to the output axis when a mirror is deselected or in the OFF position.

The pupil diagram 59 of FIG. 5B illustrates this relationship. In FIG. 5B, five pupil locations (56Y, 54B, 58, 54Y, 56B) illustrate the combination of the four pupil locations from the yellow lamp, (54Y, 58, 54B, 56Y) and the four pupil locations from the blue lamp (54B, 58, 54Y, 56B). Locations 58, 54B and 54Y are overlapping for the two diagrams, resulting in the five pupils 56Y, 54B, 58, 54Y, 56B. On the left side of the pupil diagram of FIG. 5B, components and states for the yellow light are noted. The yellow lamp is located at pupil 54Y with the yellow light output on pupil 58 when a VSP micromirror is selected for the yellow lamp. A yellow light dump is located at pupil 56Y that receives yellow light when a VSP micromirror is deselected for the yellow lamp. The position of the yellow lamp at pupil 54Y, the lens set at pupil 58 and the yellow light dump at pupil 56B correspond to the same items 54Y, 58, 56Y listed in FIG. 5A.

On the right side of the pupil diagram 59 of FIG. 5B, components and states for the blue light are shown. The blue lamp is located at pupil 54B with the blue light output on pupil 58 when a mirror is selected for the blue lamp. A blue light dump is located at pupil 56B, which receives blue light when a mirror is deselected for the blue lamp. The position of the blue lamp at pupil 54B, the lens set at pupil 58 and the blue light dump at pupil 56B correspond to the same items 54B, 58, 56B listed in FIG. 5A. Because the yellow and blue pupil diagrams have opposing physical orientations, a mirror that is "selected" for a first illumination source will be "deselected" for the second illumination source.

In operation, the VSP micromirrors 52 are modulated between the ON and OFF states at a rapid rate, mixing the blue and yellow light to create the white light. The amount of blue and yellow light contained in the white light beam can be tuned by adjusting a duty cycle (the proportional time spent in the ON and OFF states) for each illumination color. Additional embodiments can be formed by modulating each illumination source, enhancing the spectral adjustability of the output light. The micromirrors of the DMD device are individually addressable. In addition to blending the blue and yellow light, patterns can be formed in the beam by further utilizing the DMD as a spatial light modulator. Further, because the individual pixels are addressable, the spectral tuning can be extended to a spatial tuning. Regions within the projected beam can be individually spectrally tuned. In addition to global spectral tuning, the arrangements provide local spectral tuning. By rapidly switching the DMD mirror elements between positions to reflect blue and yellow light, the spectral tuning can be combined with spatially addressed regions to form different colored regions within the output beam.

The light sources in the example embodiments have different illumination profiles. The spectral tuning can compensate for these differences by using spectral tuning to achieve a uniform output over the entire field. The blue lasers that illuminate the phosphor in FIG. 5A provide a Gaussian illumination profile. In contrast, the blue LEDs have a cosine illumination profile. A conventional approach to combining these non-uniform illumination beams would include a fly's eye array or light tunnel to operate as a homogenizer. These known approaches have disadvantages for a headlamp, because the resulting output will have reduced peak luminance and a uniform beam profile on the road, but a non-uniform profile is actually preferred. In contrast to the conventional approaches, example embodiments provide spatial tuning and spectral tuning, so that a white or other desired spectral output can be achieved. Spectral tuning of the output can be achieved by rapidly switching the mirrors in the DMD array between the blue and yellow light sources, while simultaneously modulating the duty cycle of the light sources. In additional alternative approaches, individual mirror elements can be individually adapted to spectrally tune local regions in the output, such as edge regions, to improve the uniformity of color in the output beam.

Many recent and recently proposed headlight systems include several individual modules for low-beam, high-beam, auxiliary high beam and general illumination. Each of the right and left side headlamps in an automotive application can incorporate these individual modules. In an example embodiment, one or more of these individual modules could each include the arrangements described above. In one alternative approach, one of the modules could include the arrangements of the embodiments, while other modules use conventional light sources. In either case, certain conventional modules tend to project a beam that is blue tinged at the outside edges. The spectral and spatially adapted spectral tuning of the embodiments can compensate for the blue edges in the output beams of these systems by increasing yellow light in these sensitive areas, while the output light is a more balanced white in other areas.

Figure 6:
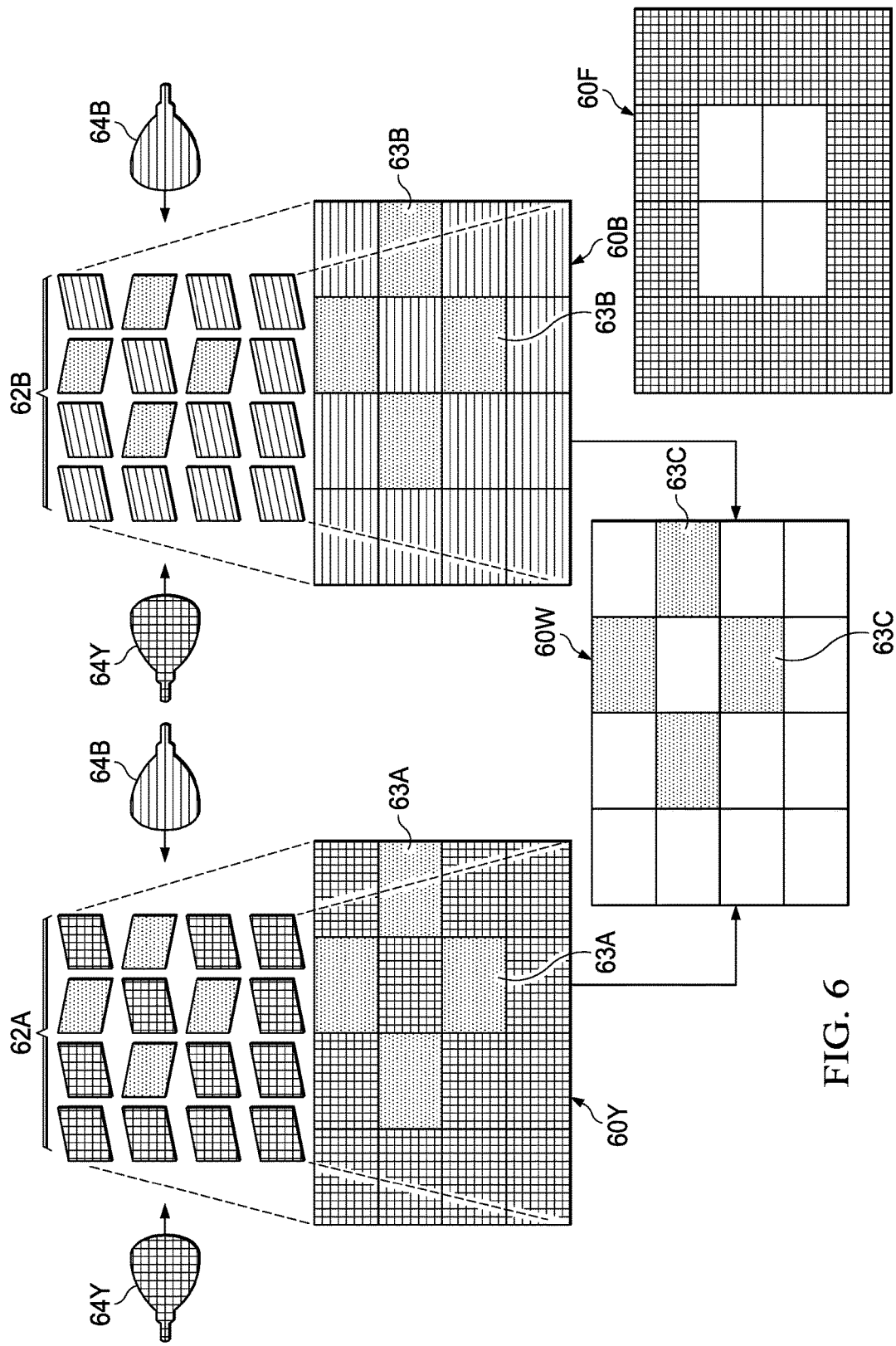
FIG. 6 illustrates adaptive beam formation in an example arrangement.

FIG. 6 further illustrates another an adaptive beam embodiment. In operation, the mirrors of the DMD (62a, 62b) are individually addressable and are rapidly alternated between the blue and yellow light beams to form the white light output by a projection system. A depiction of the white light system (while the yellow light is active) is depicted as 60Y. In 60Y: (a) the yellow lamp 64Y is selected, producing yellow light; and (b) the blue lamp 64B is deselected, producing no light. In this example, the majority of mirrors (62a) reflect the yellow light beam to the output. Four mirrors are tilted to not reflect yellow light to the output, as the uppermost mirror 62a illustrates. Following the light beam away from the DMD, the non-lit portion 63a corresponds to the mirror 62a duplicating the pattern depicted by the four non-lit mirrors.

The alternate cycle is depicted as 60B, illustrating when the blue lamp 64B is selected and producing blue light. The yellow lamp 64Y is deselected and not producing light. In this cycle, the mirrors shown in 62b have all changed to their respective opposite states, resulting in a majority of the mirrors reflecting blue light to the output. The four non-lit mirrors, represented as dark mirrors in 62b, make a pattern in the light beam where the non-lit space 63b corresponds to the non-lit mirrors in 62b. As the patterned yellow light and patterned blue are combined, the output is depicted by the white light output 60W. In the white light output 60W, the non-lit section 63c corresponds to 63a and 63b. The patterned beam could be totally absent of light as illustrated in 60W. Or, in alternative arrangements, the patterned beam could be a different color created by modulating the mirrors in a different duty cycle than the white light mirrors. An example 60F illustrates how external row pixels can be modulated to form a yellow light, while the center is modulated to form a white light. In an automotive headlamp application, this pattern can be suitable for foggy conditions. While the example in FIG. 6 shows four mirrors that are tilted differently from the remaining mirrors in the array, even a single mirror can be spectrally tuned, and the resulting pattern can be spatially adapted on as fine as a single pixel basis. More frequently, several pixels could be spatially adapted to form a visible pattern in the output beam.

In an automotive application example, messages useful to a driver can be projected onto a roadway. For example, if a navigation system is combined with an automotive headlamp using the arrangements, a navigational cue such as "take next exit" can be projected onto the roadway to assist the driver in following navigational routes. Other information (such as related to traffic, construction, or accidents in upcoming portions of the trip) can be shown on the roadway. For example, these can be shown in blue or in yellow, to further attract the driver's attention.

The spatial light modulators in the arrangements, along with dichromatic illumination, allows additional adaptive beam shaping. The output beam can be shaped so as to be "glare free", so it can be centered brightly in the middle of a lane being traversed by an automobile. The adaptive beam shaping can direct light away from oncoming traffic, or away from pedestrians, cyclists or animals that are in the areas adjacent to the roadway. By maintaining bright forward illumination without blinding other observers, the adaptive beam shaping increases driver visibility and safety. Controller 53 in FIG. 5A can adaptively shape the forward beam by appropriately patterning the pixels in the DMD.

Figure 7B:
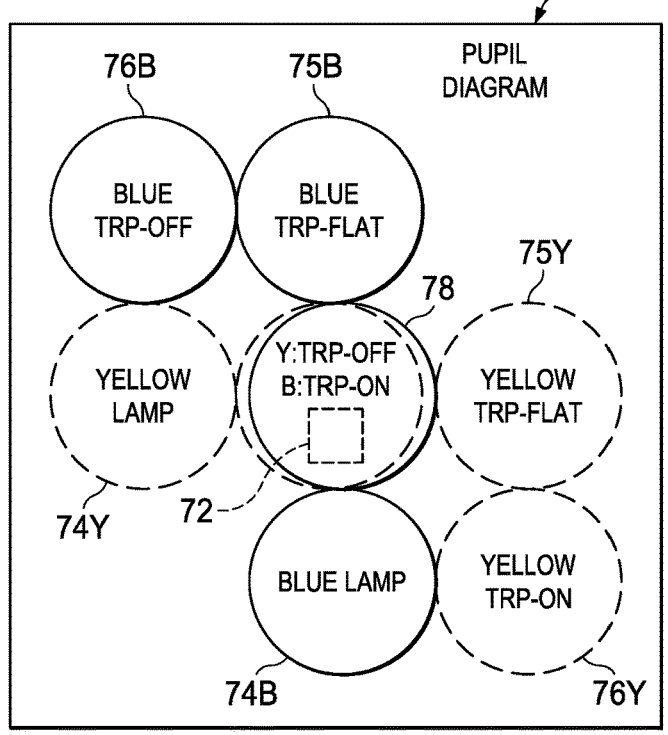
FIGS. 7A and 7B illustrate an arrangement including a TRP DMD, and a corresponding pupil diagram.
Figure 7A:
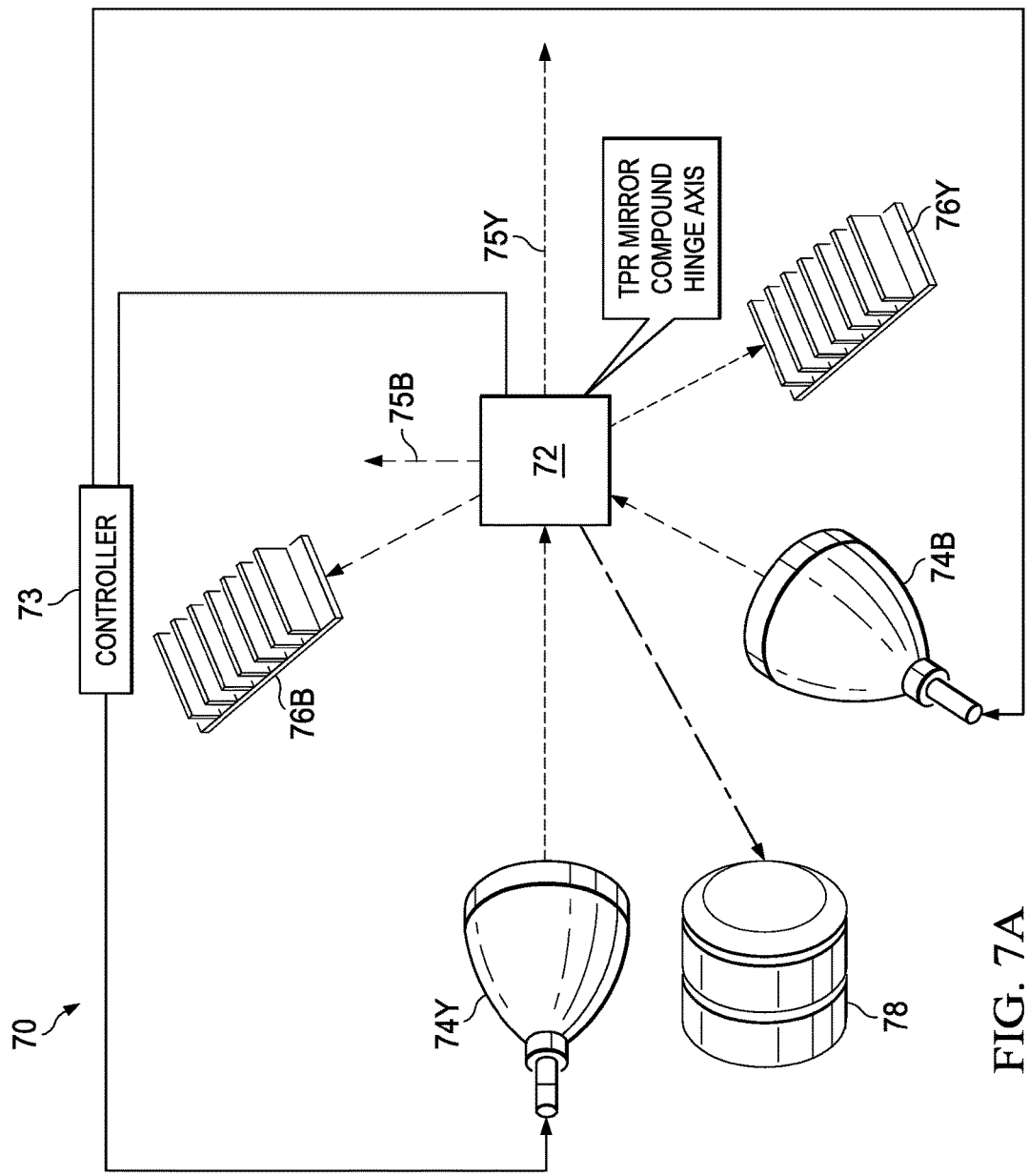

FIGS. 7A and 7B illustrate an additional embodiment utilizing a TRP DMD. In the light projection system 70, a single illustrative TRP micromirror 72 illustrates the various positions of the micromirrors. In this example, yellow and blue illumination sources form white light. For the yellow light path of FIG. 7A, a first yellow lamp 74Y outputs light focused on the TRP micromirror 72 by a focusing lens set (not shown). When the TRP micromirror 72, is deselected or in the OFF position, the yellow light beam is reflected from the TRP micromirror and exits through lens set 78. When the TRP micromirror 72 is selected or is in the ON position, the yellow light is reflected from the TRP micromirror to a light dump 76Y, which is a heat sink to dissipate heat from the yellow light. When the DMD is unpowered, the mirrors move to the FLAT state, and light reflects from the TRP micromirror along the axis 75Y when the yellow lamp is on.

For the blue light path of FIG. 7A, a blue lamp 74B is located about 90 degrees counter clockwise from the location of the yellow lamp 74Y, and the blue light is focused on the TRP micromirror 72 array by a focusing lens set (not pictured). When the DMD device is unpowered, the mirror is in the FLAT state, and the blue light reflects from the TRP micromirror along the axis 75B when the blue lamp is illuminated. With the TRP micromirror 72 in the deselected or OFF position, the blue light is reflected to the blue light dump. With the TRP micromirror 72 in the selected or ON position, the blue light reflects from the TRP micromirrors and exits through lens set 78.

In operation, the controller 73 alternates the TRP micromirrors between the ON state and the OFF state to combine the yellow light and blue light, and so produces white light. The duty cycles (between the ON and OFF states of the blue and yellow light sources) will determine the color of the white light output by the white light system. Also, the controller 73 can modulate the intensity of the yellow lamp 74Y and blue lamp 74B to vary the spectral tuning of the white light output.

In this example embodiment, seven pupils are formed when using the TRP DMD in a dichromatic white light system arrangement. The seven pupils are illustrated in the pupil diagram 79 of FIG. 7B. For convenience, the identifying numbers of the pupil diagram in FIG. 7B correspond to the positions in FIG. 7A. The pupil diagram 79 of FIG. 7B illustrates the combination of the blue pupil diagram and yellow pupil diagram with the ON pupil position 78 shared by both yellow and blue light beams. The approximate location of the TRP micromirrors 72 is indicated behind the center-most pupil location 78. In pupil diagram 79, the yellow lamp is shown located in pupil 74Y. When the DMD is unpowered, all the TRP mirrors are in a FLAT or non-tilted position. In the FLAT position, the yellow light 74Y reflects from the TRP micromirrors 72 to the yellow FLAT pupil 75Y. When the TRP mirror 72 is deselected or in the OFF state, the TRP mirror tilts from the FLAT position halfway toward the direction of the yellow light pupil 74Y. The yellow light reflects from the TRP micromirrors in the OFF state and exits the system through pupil 78. With the TRP micromirrors selected in the ON state, the mirror tilts from the FLAT position halfway toward the direction of the blue lamp pupil 74B. The yellow light reflects from the TRP micromirrors 72 to the yellow TRP-ON pupil 76Y.

In FIG. 7B, the blue lamp is shown in pupil 74B. When the DMD is unpowered, the TRP micromirrors are in a FLAT or non-tilted position. In the FLAT state, the blue light 74Y reflects from the TRP mirror to the blue light FLAT pupil 75B. As mentioned hereinabove, when a TRP micromirror is selected or in the ON state, the TRP micromirror tilts from the FLAT position halfway toward the direction of the blue light pupil 74B. In the ON state, the blue light reflects from the TRP micromirrors and exits the system through pupil 78. With a TRP micromirror deselected or in the OFF state, the mirror tilts from a FLAT position halfway toward the direction of the blue lamp pupil 74Y. In the OFF state, the blue light reflects from the TRP micromirror 72 to the blue TRP-OFF pupil 76B. The TRP micromirrors of the DMD TRP device are individually selected or deselected. In addition to blending the blue light and yellow, patterns can be formed in the output beam by utilizing the TRP DMD as a spatial light modulator. Patterns are presented to the controller 73 in the form of electronic image data. For example, the patterns illustrated in FIGS. 6A and 6B can be formed with the TRP DMD shown in FIG. 7A.

Figure 8:
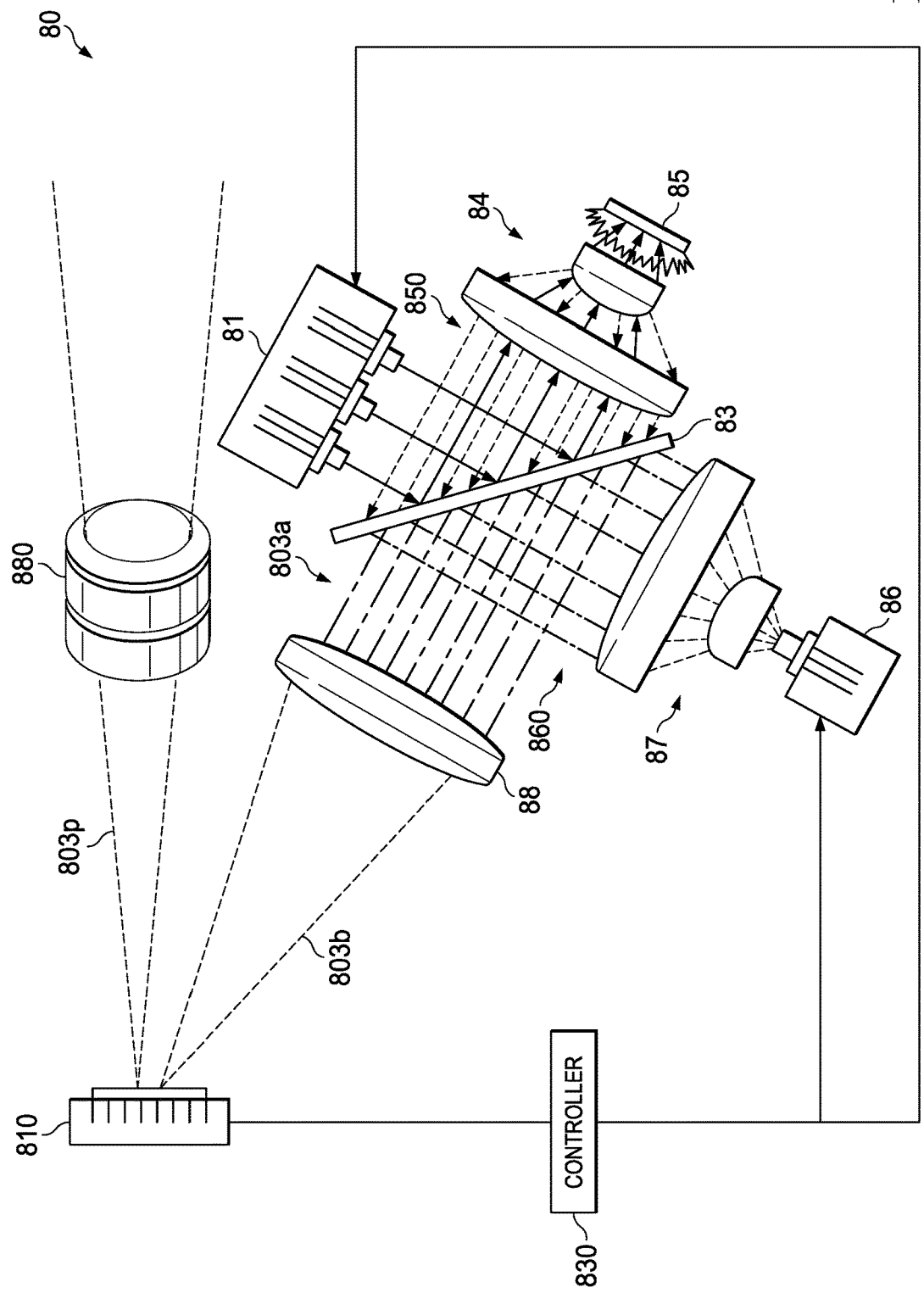
FIG. 8 illustrates another arrangement including a dichroic mirror.

FIG. 8 depicts another alternative embodiment utilizing a dichroic mirror. In system 80, a blue laser 81 excites a yellow phosphor 85 to produce yellow light. Blue light from LEDs 86 is combined with the yellow light to form a white light beam. In system 80, a set of one or more blue laser diodes 81 outputs blue laser light beams directed to a dichroic mirror 83. The dichroic mirror 83 allows yellow light to pass and reflects blue light. The dichroic mirror 83 is positioned to reflect the blue laser light through a focusing lens set 84 and onto the surface of yellow phosphor substrate 85. The yellow phosphor substrate 85 phosphoresces when struck by the blue laser light beam and emits yellow light. The yellow light 850 travels through the lens set 84 and towards the dichroic mirror 83. The dichroic mirror 83 is configured to allow yellow light to pass through, and the yellow light beam 850 proceeds toward a focusing lens set 88. A blue light source 86, such as a blue LED, outputs blue light 860 that passes through lens set 87 to the dichroic mirror 83. The dichroic mirror 83 reflects the blue light. The blue light 860 reflects from the dichroic mirror and is combined with the yellow light 850 to produce a white light 803a. The white light beam 803b passes through the focusing lens set 88 and is then focused on a spatial light modulator, which is a DMD 810 in this example. The desired portion of the white light beam 803b is reflected by the DMD 810, resulting in a patterned white light beam 803p. A pattern is formed in the white light beam 803p, determined by image data electronically presented to the DMD 810 by controller 830. The patterned light beam 803*p* then passes through the projection lens set 880 and exits the dichromatic light system.

In system 80, controller 830 performs functions such as: (a) modulating the amount of blue light outputted by the blue lamp 86; (b) modulating the power of the blue laser source 81 to modulate the amount of yellow light emitted by phosphor 85; and (c) presenting electronic image data to the DMD 810 to implement a desired pattern, if any, within the thousands of individually selectable micromirrors of the DMD, resulting in a patterned, spectrally adjustable and/or spatially adaptable white light beam.

In example embodiments, controller 830 can be implemented as an integrated circuit, which can be a dedicated integrated circuit. In alternative embodiments, the functions performed by the controller 830 can be provided by a programmable integrated circuit, such as a digital signal processor (DSP), microcontroller unit (MCU), or central processing unit (CPU) programmed with corresponding software instructions. In other examples, the functions of controller 830 can be provided by modifying the existing operations of an existing integrated circuit for use with spatial light modulators. The modifications can add instructions to control the spectral color emitted by the dichromatic light sources. User defined integrated circuits (such as field programmable gate arrays (FPGAs), complex logic programmable devices (CLPDs) and ASICs) can implement controller 830.

In additional embodiments, the yellow light beam 850 and the blue light beam 860 can be transported in free air as shown hereinabove, or in an alternative transport medium for light, such as a light tunnel, waveguide or fiber optic transport.

The arrangements can operate with digital color correction to correct the color at the output by controlling the DMD mirrors and controlling the light source modulation. The color correction can be done continuously in example systems including a color sensor. In other examples, the color correction can be done periodically by adapting the light source modulation in a calibration operation.

Figure 9:
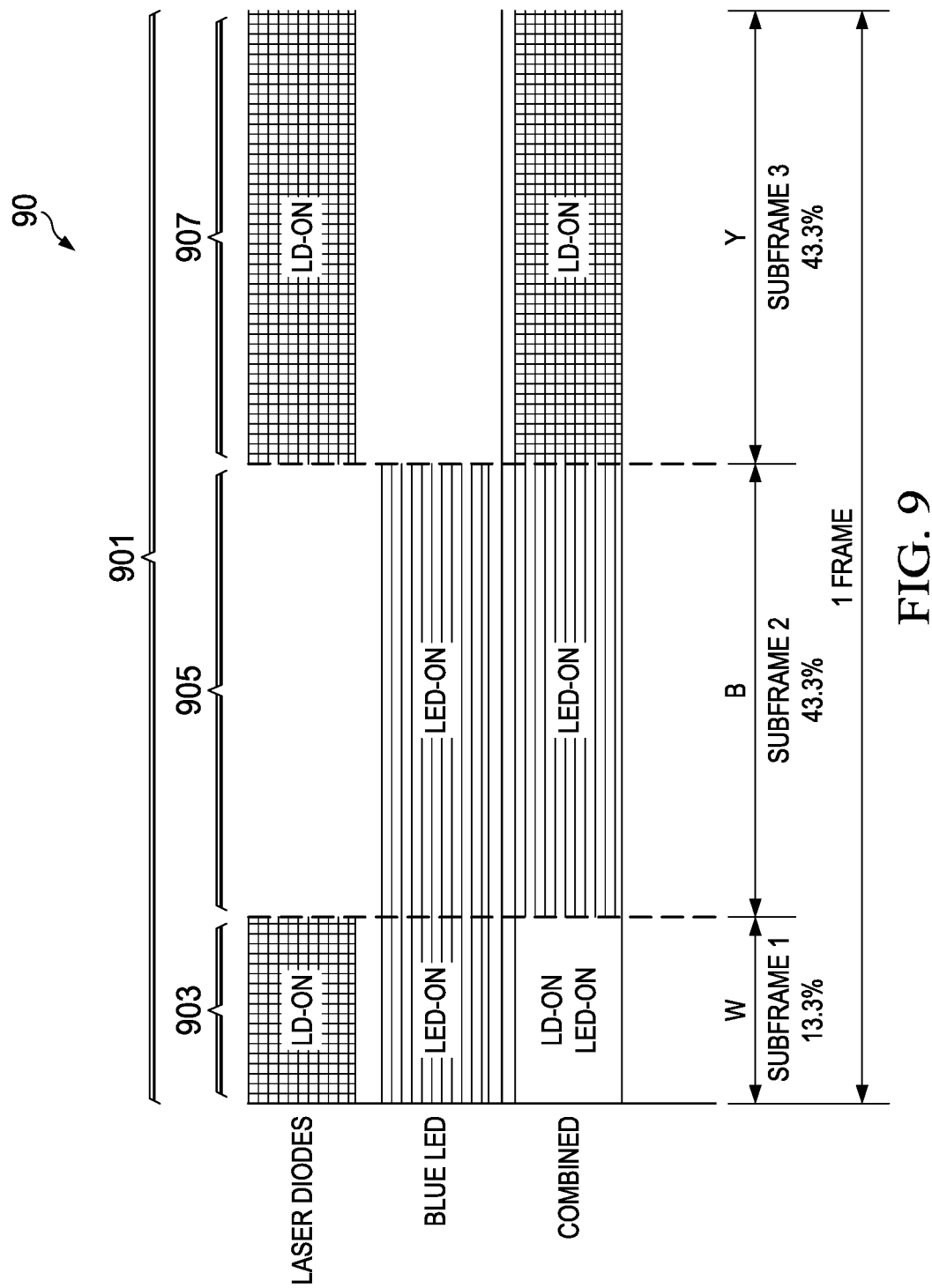
FIG. 9 is a timing diagram showing an example image frame.

FIG. 9 is a timing diagram 90. In FIG. 9, a single frame is shown (there will be many frames projected per second from the DMD in operation) where color correction is performed. In the single frame 901, both yellow and blue light sources are illuminated and reflected in the first portion of the frame, Subframe 1, labeled 903. In a second portion of the frame 901, Subframe 2, labeled 905, only the blue LED source is illuminated and reflected, so that blue light is projected at the output. In a third portion of the frame 901, Subframe 3, labeled 907, only the laser-phosphor illumination is illuminated and reflected, so the projected light is yellow for Subframe 3. A pixel level color correction mask can be applied either on a blue subframe or on a yellow subframe to modify relative contributions of yellow and blue light in areas projected on the road. In this manner, the output color can be tuned, both spectrally and spatially.

FIG. 9 shows the time weight of the various subframes, so: Subframe 1 is white due to the combination of the two colors; Subframe 2 is blue in this example frame; and Subframe 3 is yellow in this example frame. The subframes can be modulated using a duty cycle approach. The output color is spectrally tuned by the percentage weights (such as 13.3% white, 43.3% blue and 43.3% yellow in this example) for the single frame's total time. The light output from yellow and blue light sources can also be varied by changing the input power to the blue LEDs and lasers. Because the human visual system integrates the light at the output, the color seen by a human observer is the combination of the subframe colors.

Example embodiments provide a low cost illumination system that is spectrally tunable and also spatially tunable to perform beam shaping of the output beam. Arrangements are low in cost and can be adaptively spectrally tuned after manufacture, to adjust the light color throughout the life of the system. In some embodiments, continuous spectral tuning can be provided.

Accordingly, in described examples, an illumination system is arranged to project an output beam of light forward from a lens. The illumination system further includes: at least two illumination modules, each configured to output a light beam to an illumination path, the illumination modules arranged to output different color light beams; and illumination optics corresponding to each of the illumination modules, arranged to receive the different color light beams and arranged to provide illumination to a programmable spatial light modulator. The programmable spatial light modulator is arranged to receive the illumination and is arranged to output illumination as patterned light to projection optics. The projection optics are arranged for receiving the patterned light and further arranged to output the patterned light through the lens. A controller coupled to the illumination modules and to the spatial light modulator is arranged to control the intensity and duration of the light output by the illumination modules and to control a pattern of the spatial light modulator. The output beam is a color formed by combining the different color light beams, and the output beam is spectrally tunable.

In a further example, the spatial light modulator includes a digital micromirror device. In some examples, the digital micromirror device has tilt positions that are at +/−12 degrees with respect to an unpowered position. In another example, the digital micromirror device has tilt positions that are at +/−17 degrees with respect to an unpowered position.

In at least one example, the first illumination module of the illumination modules is arranged to produce a light beam color using a phosphor. In another example, a second illumination module of the illumination modules is arranged to produce a light beam color without using a phosphor. In yet another example, the combined colors of the light beams output by the two illumination modules produce a white light beam. In an alternative example, a first illumination module of the illumination modules is arranged to output a yellow light beam and a second illumination module of the illumination modules is arranged to output a blue light beam. In still a further alternative example, the color of the output beam is spectrally tunable.

In yet another example, the illumination system further includes a dichroic mirror positioned to direct the light beams of the illumination modules onto the spatial light modulator. In still another example, the spatial light modulator is arranged to adaptively change a pattern of the output beam responsive to the controller. In a further example, the output beam is spectrally tunable over an entire image. In another example, the output beam is spectrally tunable on a pixel basis.

An example automotive headlamp includes: a first illumination source arranged to output a first color light; a second illumination source arranged to output a second color light different from the first color light; a digital micromirror device directed to receive the first color light and to receive the second color light; projection optics arranged to receive light reflected from the spatial light modulator and arranged to output a beam having a color that is a combination of the first and second colors; and a controller arranged to control the intensity and duration of the first illumination source and the second illumination source and arranged to control a pattern on the digital micromirror device; wherein the controller is arranged to spectrally tune the color of the output beam.

In another example, the first illumination source in the automotive headlamp further includes a phosphor arranged to emit light when illuminated; and an illumination source arranged to illuminate the phosphor. In yet another example, the automotive headlamp includes a yellow phosphor and the first color light is yellow light. In another example, the automotive headlamp includes the second illumination source arranged to emit light without a phosphor. In a further example, the second illumination source is arranged to emit the second color light that is blue. In an additional example, in the automotive headlamp, the projection optics are arranged to output a beam of white light that is a combination of the first color light and the second color light.

Another example illumination system includes: a digital micromirror device arranged to reflect illumination light as a patterned light beam; projection optics positioned to receive the patterned light beam and arranged to project an output light beam; a first illumination source arranged to output light of a first color and further including laser diodes positioned to output light and including a phosphor positioned to receive the output light after it is reflected from a first surface of a dichroic mirror. The phosphor is arranged to output the first color light in response to the output light. A second illumination source is arranged to output light of a second color different from the first color and is positioned to illuminate a second surface of the dichroic mirror. Illumination optics are arranged to receive reflected light of the second color from the second surface of the dichroic mirror and further arranged to receive the first color light from the phosphor transmitted through the dichroic mirror. The illumination optics are positioned to transmit the received light of the first color and the second color to a surface of the digital micromirror device. A controller is arranged to control intensity and duration of the light from the first illumination source and to control the intensity and duration of the light from the second illumination source and further arranged to control the pattern on the digital micromirror device. The light beam output from the illumination system is arranged to be a visibly white light that is a combination of the first color and the second color. In another example, the controller is arranged to spectrally tune the white light.

Modifications are possible in the described embodiments, and other embodiments are possible that are within the scope of the claims.

What is claimed is:

1. A headlamp, comprising:
a first illumination source configured to output a first color light;
a second illumination source configured to output a second color light having a color different from the first color light;
a digital micromirror device optically coupled to the first and second illumination sources, the digital micromirror device configured to receive the first color light and the second color light, and to reflect the first color light and the second color light;
projection optics optically coupled to the digital micromirror device, the projection optics configured to receive reflected light from the digital micromirror device, and to output a beam having a color that is a combination of the first and second color lights; and
a controller coupled to the digital micromirror device and to the first and second illumination sources, the controller configured to:
control intensity and duration of the first color light;
control intensity and duration of the second color light;
control a pattern on the digital micromirror device, including by controlling a first pattern for simultaneously receiving the first color light and the second color light at the digital micromirror device, controlling a second pattern different from the first pattern for receiving the first color light at the digital micromirror device in absence of the second color light, and controlling a third pattern for receiving the second color light at the digital micromirror device in absence of the first color light, the output beam representing a color over time that results from the reflected combined first and second color light, the reflected first color light, and the reflected second color light; and
spectrally tune the color of the output beam.

2. The headlamp of claim 1, wherein the first illumination source further includes:
a phosphor configured to emit light when illuminated; and
an illumination source optically coupled to the phosphor, the illumination source configured to illuminate the phosphor.

3. The headlamp of claim 2, wherein the phosphor is yellow, and the first color light is yellow light.

4. The headlamp of claim 1, wherein the second illumination source is configured to emit light without a phosphor.

5. The headlamp of claim 4, wherein the second illumination source is configured to emit blue light.

6. The headlamp of claim 1, wherein the projection optics is configured to output a beam of white light that is a combination of the first color light and the second color light.

7. An illumination system, comprising:
a dichroic mirror having first and second surfaces;
a digital micromirror device configured to reflect illumination light as a patterned light beam;
projection optics optically coupled to the digital micromirror device, the projection optics configured to receive the patterned light beam, and to project an output light beam in response to the patterned light beam;
a first illumination source optically coupled to the dichroic mirror, the first illumination source configured to output a first color light, and the first illumination source including: laser diodes configured to illuminate the first surface of the dichroic mirror; and a phosphor configured to emit the first color light in response to light reflected from the first surface of the dichroic mirror;
a second illumination source optically coupled to the dichroic mirror, the second illumination source configured to output a second color light to illuminate the second surface of the dichroic mirror, the second color light having a color different from the first color light;
illumination optics optically coupled to the digital micromirror device, the illumination optics configured to: receive the second color light reflected from the second surface of the dichroic mirror; receive the first color light from the phosphor via the dichroic mirror; and transmit the received first color light and the received second color light to a surface of the digital micromirror device; and a controller coupled to the digital micromirror device and to the first and second illumination sources, the controller configured to:
control intensity and duration of the first color light;
control intensity and duration of the second color light; and
control a pattern of the patterned light beam reflected from the digital micromirror device, including by controlling a first pattern for simultaneously receiving the first color light and the second color light at the digital micromirror device, controlling a second pattern different from the first pattern for receiving the first color light at the digital micromirror device in absence of the second color light, and controlling a third pattern different from the first and second patterns for receiving the second color light at the digital micromirror device in absence of the first color light, the reflected patterned light representing over time a color that is a combination of the first and second color lights;
the output light beam having a visibly white color that is a combination of the first and second color lights.

8. The illumination system of claim 7, wherein the controller is configured to spectrally tune the color of a portion of the output light beam.

9. The illumination system of claim 7, wherein the controller is configured to spatially tune the color of a portion of the output light beam.

10. The illumination system of claim 7, wherein the controller is configured to spectrally and spatially tune the color of a portion of the output light beam.

11. The illumination system of claim 1, wherein the controller is configured to spatially tune the color of the output light beam.

12. A headlamp, comprising:
a dichroic mirror having first and second surfaces;
a digital micromirror device configured to reflect illumination light as a patterned light beam;
projection optics optically coupled to the digital micromirror device, the projection optics configured to receive the patterned light beam, and to project an output light beam in response to the patterned light beam;
a first illumination source optically coupled to the dichroic mirror, the first illumination source configured to output a first color light, and the first illumination source including: laser diodes configured to illuminate the first surface of the dichroic mirror; and a phosphor configured to emit the first color light in response to light reflected from the first surface of the dichroic mirror;

a second illumination source optically coupled to the dichroic mirror, the second illumination source configured to output a second color light to illuminate the second surface of the dichroic mirror, the second color light having a color different from the first color light;
illumination optics optically coupled to the digital micromirror device, the illumination optics configured to:
receive the second color light reflected from the second surface of the dichroic mirror; receive the first color light from the phosphor via the dichroic mirror; and transmit the received first color light and the received second color light to a surface of the digital micromirror device; and
a controller coupled to the digital micromirror device and to the first and second illumination sources, the controller configured to:
control intensity and duration of the first color light;
control intensity and duration of the second color light; and
control a pattern of the patterned light beam reflected from the digital micromirror device, including by controlling a first pattern for simultaneously receiving the first color light and the second color light at the digital micromirror device and outputting a first reflected light pattern for a first portion of a frame time, controlling a second pattern different from the first pattern for receiving the first color light at the digital micromirror device in absence of the second color light and outputting a second reflected light pattern for a second portion of the frame time, and controlling a third pattern different from the first and second patterns for receiving the second color light at the digital micromirror device in absence of the first color light and outputting a third reflected light pattern for a third portion of the frame time, the reflected patterned light representing over time a color that is a combination of the first and second color lights;
the output light beam having a visibly white color that is a combination of the first and second color lights.

13. The headlamp of claim 12, wherein the controller is configured to spatially tune the color of the output light beam.

14. The headlamp of claim 12, wherein the controller is configured to spectrally tune the color of the output light beam.

15. The headlamp of claim 12, further comprising a sensor coupled to the controller, the sensor configured to sense the color of the output light beam, and the controller configured to adaptively spectrally tune the color of the output light beam in response to a signal from the sensor.

* * * * *